(12) United States Patent
Albou et al.

(10) Patent No.: US 9,039,259 B2
(45) Date of Patent: May 26, 2015

(54) LIGHTING MODULE GENERATING AN INTERLACING OF LIGHT STRIPS

(71) Applicant: Valeo Vision, Bobigny Cedex (FR)

(72) Inventors: Pierre Albou, Paris (FR); Benoit Reiss, Margency (FR); Vanesa Sanchez, Paris (FR)

(73) Assignee: Valeo Vision, Bobigny (FR)

( * ) Notice: Subject to any disclaimer, the term of this patent is extended or adjusted under 35 U.S.C. 154(b) by 87 days.

(21) Appl. No.: 13/714,735

(22) Filed: Dec. 14, 2012

(65) Prior Publication Data
US 2013/0155710 A1 Jun. 20, 2013

(30) Foreign Application Priority Data

Dec. 19, 2011 (FR) ...................................... 11 61906

(51) Int. Cl.
| | |
|---|---|
| *B60Q 1/00* | (2006.01) |
| *B60Q 3/00* | (2006.01) |
| *B60Q 11/00* | (2006.01) |
| *B60Q 1/04* | (2006.01) |
| *F21S 8/10* | (2006.01) |
| *F21V 7/00* | (2006.01) |

(52) U.S. Cl.
CPC ................ *B60Q 1/04* (2013.01); *B60Q 1/0041* (2013.01); *F21S 48/1159* (2013.01); *F21S 48/1163* (2013.01); *F21S 48/1747* (2013.01); *B60Q 2300/056* (2013.01); *F21V 7/00* (2013.01)

(58) Field of Classification Search
CPC .............. F21S 48/1159; F21S 48/1163; F21S 48/1747; F21S 48/1241; B60Q 2300/054; B60Q 2300/056; B60Q 2300/45; B60Q 2300/41; B60Q 2300/42
USPC ................ 362/507, 525, 538–541, 543–545, 362/516–518, 511, 509; 359/839
See application file for complete search history.

(56) References Cited

U.S. PATENT DOCUMENTS

| | | | | |
|---|---|---|---|---|
| 6,619,825 | B2 * | 9/2003 | Natsume ........................ | 362/509 |
| 6,796,695 | B2 * | 9/2004 | Natsume ........................ | 362/518 |
| 6,896,397 | B2 * | 5/2005 | Yamada et al. ................ | 362/511 |
| 7,824,086 | B2 | 11/2010 | Yamamura et al. | |
| 2009/0073712 | A1 | 3/2009 | Yamamura et al. | |

FOREIGN PATENT DOCUMENTS

| | | |
|---|---|---|
| EP | 2037167 | 3/2009 |
| EP | 2184532 | 5/2010 |
| EP | 2278217 | 1/2011 |
| EP | 2280215 | 2/2011 |

\* cited by examiner

*Primary Examiner* — Mary McManmon
*Assistant Examiner* — Cassandra A Bazemore
(74) *Attorney, Agent, or Firm* — Jacox, Meckstroth & Jenkins

(57) ABSTRACT

A lighting module comprising at least one first lighting device and one second lighting device; the first lighting device comprises a support common to at least one first light emitter generating a first light strip and at least one second light emitter generating a second light strip. The first light emitter is arranged relative to second light emitter so as to generate a zone that is unlit by the first lighting device between the first light strip and the second light strip. The at least one second lighting device generates at least one third light strip that extends in the zone that is unlit.

23 Claims, 3 Drawing Sheets

LIGHTING MODULE GENERATING AN INTERLACING OF LIGHT STRIPS

CROSS-REFERENCE TO RELATED APPLICATIONS

This application claims priority to French Application No. 1161906 filed Dec. 19, 2011, which application is incorporated herein by reference and made a part hereof.

BACKGROUND OF THE INVENTION

1. Field of the Invention

The technical sector of the present invention is that of lighting and/or signalling devices or means for motor vehicles.

2. Description of the Related Art

In the motor-vehicle field, there is a need to be able to illuminate the road being taken by the vehicle in a "partial-road lighting mode", namely to generate in a high beam one or more dark areas corresponding to the places where there are vehicles coming in the opposite direction or vehicles travelling in front, so as to prevent the dazzling of other drivers while lighting the road in its largest surface area. Such a function is called ADB (Adaptive Driving Beam).

It is known practice to generate this function by aligning a plurality of light sources and by controlling the switching on or switching off of these sources. However this technical solution leaves unlit slots between each light strip created by the light sources. Such a defect results from the fact that these light sources cannot be totally adjacent beside one another, the technology employed for these sources requiring a minimum distance between each source.

Document EP2278217A7 discloses a lighting module for a motor vehicle fulfilling such a function. It comprises a plurality of light emitters, each light emitter being associated with a lens and with a mirror placed behind each lens in order to send the light rays originating from the associated emitter to the lens. Thus, each assembly consisting of the emitter, of the lens and of the mirror generates a light strip, a multiplicity of light strips thus created forming an overall light beam. The switching on or switching off of some of these light strips formed vertically makes it possible to delimit a dark zone in which the vehicle that it is desired to prevent dazzling is placed.

This module of the prior art has a drawback. Specifically, the efficacy and the sharpness of the ADB function reside in a considerable number of light strips, for example twelve light strips. According to the prior-art document indicated above, this involves installing in a motor-vehicle headlight twelve emitters, twelve mirrors and twelve lenses. The space available in the headlight does not allow all these components to be housed which, in practice, prevents the use of the module according to this prior art.

Moreover, this multiplicity of components puts a strain on the cost of the function and thus prevents its installation in mid-range and low-range vehicles.

Finally, the ADB function generated by these twelve assemblies involves a management of the heat losses and an alignment of each of the twelve assemblies in relation to one another.

It can therefore be understood that the installation of the prior-art solution is the source of major technical problems.

SUMMARY OF THE INVENTION

The object of the present invention is therefore to resolve the drawbacks described above mainly by providing a first optical module which comprises a multiplicity of light emitters on one and the same support, the emitters being spaced from one another so as to create a window that is unlit by the first optical module, a second optical module being arranged to produce a light strip which fills the unlit window. The inventors are therefore going against the current practice which tends to bring the sources closer together in order to limit the unlit zones.

The subject of the invention is therefore a lighting module comprising at least one first lighting device and one second lighting device; the first lighting device comprises a support common to at least one first light emitter generating a first light strip and to at least one second light emitter generating a second light strip, the first light emitter being arranged relative to the second light emitter so as to generate a zone that is unlit by the first lighting device between the first light strip and the second light strip, wherein the second lighting device generates at least one third light strip which extends in the zone, and in that the first lighting device comprises a single reflector which reflects a first light beam generating the first light strip and a second light beam generating the second light strip.

The second lighting device is arranged so that the third light strip covers the totality of the zone that is unlit by the first lighting device without overlapping the adjacent light strips, notably the first light strip and the second light strip.

According to a first feature of the invention, the first light emitter is spaced from the second light emitter by a distance determined by a width of the third light strip.

According to a second feature of the invention, the first lighting device has a first optical axis, the second lighting device has a second optical axis, the first optical axis and the second optical axis forming a non-zero angle between them.

In such a situation, the angle is between 0.5° and 4°, the values between 1° and 2° being suitable more particularly in terms of performance and of space requirement.

According to yet another feature of the invention, the first lighting device comprises a single focusing device which focuses the first light beam and the second light beam. It is understood in this situation that the focusing device is common to the light emitters constituting the first lighting device.

According to yet another feature of the invention, a width of the zone is equal to a width of the third light strip. Thus, the zone that is unlit by the first lighting device is filled by a single light strip emitted by the second lighting device.

It can also be specified that a width of the unlit zone is equal to a whole number of light strips generated by the second lighting device. In such a situation, the invention chooses to space the light emitters of the first lighting device by a value corresponding to a multiple of the width of a light strip generated by the second lighting device.

According to one exemplary embodiment, the first lighting device comprises at least the first light emitter installed between the second light emitter and a fourth light emitter, the first light emitter, the second light emitter and the fourth light emitter being aligned on the support; the second lighting device comprises at least a third light emitter generating the third light strip and installed between a fifth light emitter and a sixth light emitter, the third light emitter, the fifth light emitter and the sixth light emitter being aligned on a frame, the light intensity emitted by the first light emitter and/or by the third light emitter being greater than the light intensity emitted by any one of the other light emitters.

Advantageously, the second lighting device comprises a single reflector which reflects a light beam emitted at least by the third light emitter, the fifth light emitter and/or the sixth light emitter.

Again advantageously, the second lighting device comprises a single focusing device which focuses the light beam emitted by the third light emitter, the fifth light emitter and/or the sixth light emitter.

As for the first lighting device, this structure makes it possible to limit the number of parts necessary for the function by making the reflector and/or the focusing device common to several light emitters.

According to another feature of the invention, the plurality of light strips generated by the first lighting device and by the second lighting device forms an overall beam, notably in order to produce a high beam of a motor vehicle, the module comprising at least one additional lighting means designed to form a side beam adjacent to the overall beam. While the light strips each form an elongate rectangle, the additional lighting means is arranged to form a side beam of which the shape is, for example, a quarter circle.

According to yet another variant embodiment of the invention, the first lighting device and/or the second lighting device comprise a mask in which a slot is arranged in order to delimit a light strip from a light emitter projecting a diffuse light beam. The rectangular and elongate shape of the light strips is therefore produced by a mask which lets the required light rays pass through. Such a solution makes it possible to employ light emitters of which the beam is broader, these light emitters having a lower cost than an emitter having a beam that is strip-shaped.

The invention also covers a front headlight for a motor vehicle comprising at least one lighting module according to any one of the features detailed above.

Finally, the invention covers a lighting assembly of a motor vehicle comprising two headlights capable of being installed one at the front right of the vehicle and the other at the front left of the vehicle, comprising at least one lighting module according to any one of the features mentioned above, in which the first lighting device is installed in one of the headlights while at least the second lighting device is installed in the other headlight.

A principal advantage of the invention lies in the possibility of easily generating an overall beam consisting of a plurality of partial beams in light-strip form, no unlit slot appearing in the overall beam.

Another advantage lies in the possibility of integrating this module very easily into a headlight, since it comprises fewer parts than the solutions of the prior art.

Other features, details and advantages of the invention will emerge more clearly on reading the description given below as an indication with respect to the drawings in which:

BRIEF DESCRIPTION OF THE ACCOMPANYING DRAWINGS

DETAILED DESCRIPTION OF THE PREFERRED EMBODIMENTS

Figure 1:
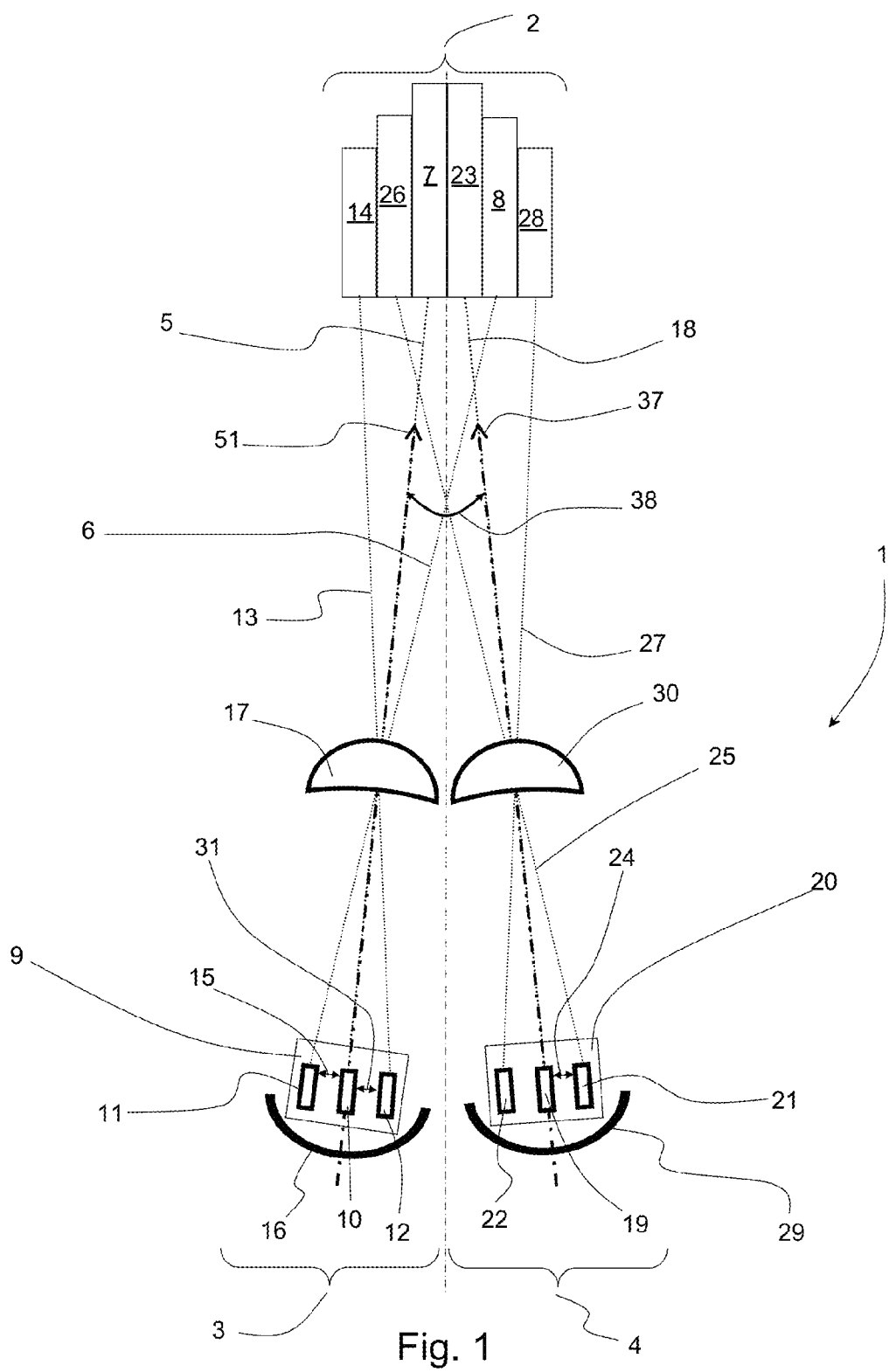
FIG. 1 is a schematic view of a lighting module according to the invention.

FIG. 1 illustrates a lighting module 1 designed to be fitted to a motor vehicle. Such a lighting module 1 is arranged to apply the ADB function, that is to say a selective switching on and a selective switching off of a light beam of the high-beam type. Such a lighting module therefore generates an overall beam 2 from a juxtaposition of partial beams, hereinafter called the first light strip 7, second light stripy 8 and third light strip 23.

This lighting module 1 comprises at least one first lighting device 3 and one second lighting device 4, advantageously distinct from the first lighting device 3. The first lighting device 3 provides at least one first light beam 5 and a second light beam 6, these beams each forming a light strip of rectangular shape, respectively called first light strip 7 and second light strip 8.

The first lighting device 3 comprises a support 9 to which are secured a first light emitter 10 and a second light emitter 11. This support 9 is therefore a part that is common to the plurality of light emitters forming the first lighting device 3. This support 9 is for example formed by a printed circuit board onto which the light emitters 10, 11 are soldered, the latter notably taking the form of light-emitting diodes.

According to the exemplary embodiment of FIG. 1, the lighting device comprises a fourth light emitter 12 secured to the support 9.

The first light emitter 10 generates the first light beam 5, the second light emitter 11 generates the second light beam 6 and the fourth light emitter 12 generates a fourth light beam 13, the latter forming a light strip of rectangular and elongate shape referenced 14.

Each of these light beams extends along an optical axis, the latter corresponding to a straight line in which the light beam concerned extends. In FIG. 1, these optical axes are indistinguishable from the first beam 5, the second beam 6 and the fourth beam 13.

The plurality of beams generated by the first lighting device 3 forms an intermediate beam which extends along a first optical axis 51, the latter being the result of the optical axes of each of the beams of the first lighting device 3. According to the example of FIG. 1, this first optical axis 51 is indistinguishable from the optical axis of the first beam 5 because the distance that separates the first light emitter 10 from the second light emitter 11 is equal to the distance that separates the first light emitter 10 from the fourth light emitter 12. Naturally, the invention covers the situation in which these distances are not equal, which results in a first optical axis 51 offset from the first beam 5.

The first light emitter 10 and the second light emitter 11 are secured to the support 9 spaced at a distance from one another. In other words, these two light emitters 10, 11 are not adjacent to one another. The distance 15 that separates the first light emitter 10 from the second light emitter 11 generates a zone that is unlit by the first lighting device 3, this zone being more particularly visible in FIG. 4. This zone that is unlit by the first lighting device 3 is situated between the first light beam 5 and the second light beam 6, and it therefore forms a dark strip between the first light strip 7 and the second light strip 8.

Naturally, such a distance, referenced in this instance 31, is also used between the first light emitter 10 and the fourth light emitter 12, for the same purpose as detailed above, that is to say to form another zone unlit by the first lighting device 3.

These distances 15 or 31 that separate the light emitters are chosen in a manner that is determined so that the dark strip has a width equivalent to a light strip emitted by the second lighting device 4.

The first lighting device 3 also comprises a reflector 16 of which the function is to collect the light rays emitted by the first light emitter 10, the second light emitter 11, and any additional light emitter, notably the fourth light emitter 12, which the first lighting device 3 may comprise. Thus, only one reflector 16 is used to send the light beam emitted by a plurality of light emitters 10, 11 and/or 12.

The first lighting device 3 also comprises a focusing device 17 of which the function is to focus the first beam 5, the second beam 6 and optionally all the other beams generated by the light emitters 10, 11 and/or 12 secured to the support 9. It is therefore understood that this involves a single focusing device that is put to use to generate several light strips 7, 8, 14 forming the overall beam 2. According to one exemplary embodiment, such a focusing device 17 is a lens having one flat face and one concave face.

The second lighting device 4 is arranged in the lighting module 1, that is to say relative to the first lighting device 3, so as to generate at least one third light beam 18 which extends in the zone that is unlit by the first lighting device 3.

Such a second lighting device 4 therefore comprises at least one third light emitter 19 which is the source of the third light beam 18, in order to generate a third light strip 23.

According to the exemplary embodiment of FIG. 1, the second lighting device 4 has a structure similar to the structure of the first lighting device 3 detailed above. In general, the second lighting device 4 comprises at least as many light emitters as the unlit zones created by the first lighting device 3. In the present case, the second lighting device comprises a frame 20, otherwise called a support, that is common to the third light emitter 19, to a fifth light emitter 21 and to a sixth light emitter 22.

The third light emitter 19 generates the third beam 18 which results in the light strip 23, the latter extending in the zone that is unlit by the first lighting device 3 situated between the first light strip 7 and the second light strip 8.

Similarly, the fifth light emitter 21 is installed on the frame 20 at a distance 24 from the third light emitter 19 so as to generate a fifth light beam 25 which covers the zone that is unlit by the first lighting device 3 situated between the first light strip 7 and the fourth light strip 14. Thus, the fifth light beam 25 forms a fifth light strip 26.

It will be noted that the sixth light emitter 22 produces a sixth light beam 27 which results in a sixth light strip 28 adjacent to the second light strip 8 on the opposite side from the third light strip 23 relative to this second light strip 8.

According to one exemplary embodiment, the second lighting device 4 comprises a single reflector 29 and/or a single focusing device 30. Reference should be made to the detailed description above of the reflector 16 and of the focusing device 17 of the first lighting device 3, this description applying mutatis mutandis to the reflector 29 and to the focusing device 30 of the second lighting device 4.

Naturally, the invention also covers the situation in which the second lighting device 4 has a structure that differs from the first lighting device 3 to the extent that the latter supplies one or more light strips in line with the zone or zones that are unlit by the first lighting device 3.

According to one exemplary embodiment, the emitters detailed above are rectangular so as to directly form the light beam so that the latter forms a rectangular and elongate light strip. Thus, the lateral edges of each light strip are determined by the light emitter, notably when it involves a light-emitting diode.

According to the invention, the distance 15 that separates the first light emitter 10 from the second light emitter 11 is determined such that a width of the zone unlit by the first lighting device 3 is equal to a width of the third light strip 23 generated by the second lighting device 4.

In a complementary manner, this distance 15 is chosen such that the width of the zone unlit by the first lighting device 3 is equal to a whole number of beams generated by the second lighting device 4. Thus, it is envisaged that the second lighting device 4 covers the zone by way of two, three or four light strips each generated by one specific light emitter.

Naturally, the distance 24 between the third light emitter 19 and the fifth light emitter 21 is also determined by the width of the zone unlit by the first lighting device 3 situated between the first light strip 7 and the fourth light strip 14.

FIG. 1 also shows the angular inclination between the first lighting device 3 and the second lighting device 4.

The first optical axis 51 defines the positioning of the first lighting device 3. The third light beam 18 also extends along a second optical axis 37 determined by the positioning of the second lighting device 4. The overlap of the zones unlit by the first lighting device 3 by the light band or bands generated by the second lighting device 4 comes into play when this second optical axis 37 forms a non-zero angle 38 with the first optical axis 51.

A distortion of the light beams is acceptable when this angle 38 is limited to 4°, the lower limit of 0.5° forming the minimum angle to perform the overlapping function, otherwise called interlacing of the light strips. It will be noted that the values between 1° and 2° are particularly appropriate for current motor vehicles.

It is therefore understood from the foregoing that the light beams generated by the first lighting device 3 and by the second lighting device 4 are interlaced so as to form an overall beam, while giving the possibility of switching off one or the other of the beams for the purpose of fulfilling the ADB function.

The overall beam 2 that can be seen in FIG. 1 has a pyramid shape. In this way, the lighting is enhanced in the axis of the road travelled by the vehicle. Such a function is obtained through the fact that some of the emitters forming the first lighting device 3 and the second lighting device 4 have a light intensity that differs from the others. The light intensity emitted by the first light emitter 10 and/or by the third light emitter 19 is greater than the light intensity emitted by any one of the other emitters. Optionally, the light intensity of the second light emitter 11 and of the fifth light emitter 21 is also greater than the light intensity supplied by the fourth light emitter 12 and the sixth light emitter 22.

Figure 2:
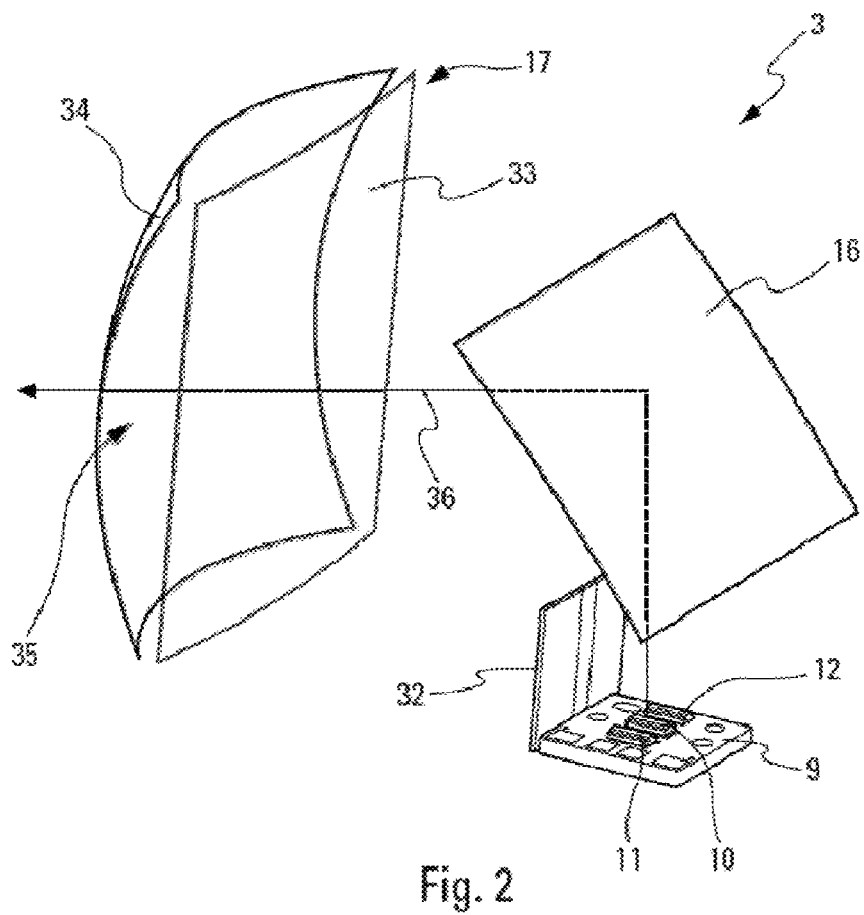
FIG. 2 is a view in perspective of a lighting device used in the lighting module according to the invention.

FIG. 2 shows an exemplary embodiment of a lighting device used in the lighting module according to the invention. The description below will be made with reference to the first lighting device 3, but it applies equally to the other lighting devices, notably the second lighting device 4, in the variant in which the latter are similar.

The support 9 is a printed circuit board or card that receives on one and the same face the first light emitter 10, the second light emitter 11 and the fourth light emitter 12. The latter are light-emitting diodes of rectangular shape. The support may also receive electronic components, for example, that are necessary for the switching on or the switching off of these emitters.

Perpendicularly to the extension plane of the support 9, there is a blanking element 32 of which the function is to prevent a direct emission of the light rays generated by the emitters to the focusing device 17. This blanking element 32 may notably have a reflective surface so as to return these rays to the reflector 16. The latter takes a parabolic shape, for example, or optionally an elliptical shape.

The focusing device 17 is a lens having a first face 33 which directly faces the reflector 16. This first face 33 is in this instance cylindrical with a vertical axis.

The lens is delimited by a second face 34 which is opposite to the first face 33 relative to a body 35 of the lens. This second face 34 has a concave shape seen from the first face 33.

The light beams, shown in this instance generally by an arrow referenced 36, are emitted by the emitters 10 to 12 and strike a surface of the reflector 16. The latter redirects them to the focusing device 17 in order to be projected onto the road to be travelled by the vehicle.

Figure 3:
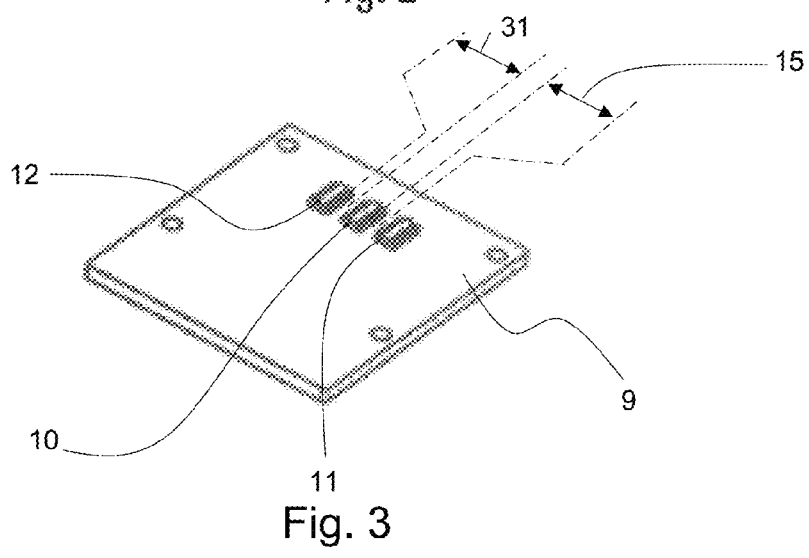
FIG. 3 is a view in perspective of the support forming a lighting device of FIG. 2, illustrating the determined distance that separates the light emitters.

FIG. 3 shows in detail the support 9 and in particular the positioning of the emitters relative to one another. The emitters shown in this figure are light-emitting diodes of rectangular shape. The first light emitter 10 is therefore spaced from the second light emitter 11 by the distance referenced 15. The fourth light emitter 12 is also installed beside the first light emitter 10 but separated from the latter by the distance referenced 31, the latter being for example equal to the distance 15. It will be noted that the first light emitter 10, the second light emitter 11 and optionally the fourth light emitter 12 each extend in parallel directions. According to one exemplary embodiment, the first light emitter 10, the second light emitter 11 and the fourth light emitter 12 are aligned on one and the same straight line. Since each light emitter has a rectangular shape, the straight line in question passes through one and the same side of each of the emitters, the latter then forming a row on the support 9.

The same applies to the second lighting device 4 in which the third light emitter 19 is installed between the fifth light emitter 21 and the sixth light emitter 22. The third light emitter 19, the fifth light emitter 21 and the sixth light emitter 22 are aligned on the frame in a manner similar to the first lighting device 3.

Figure 4:
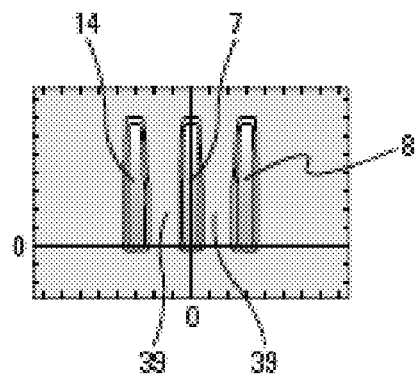
FIG. 4 is a representation of the light projection generated by the first lighting device.

FIG. 4 shows the light strips generated by the first lighting device 3. This figure highlights the presence of the zones 39 that are unlit by the first lighting device 3.

This figure shows the central light strip 7 generated by the first light emitter 10, the second light strip 8 created by the second light emitter 11 and the fourth light strip 14 generated by the fourth light emitter 12. Between these light strips can be seen the unlit zones referenced in this instance 39.

Figure 5:
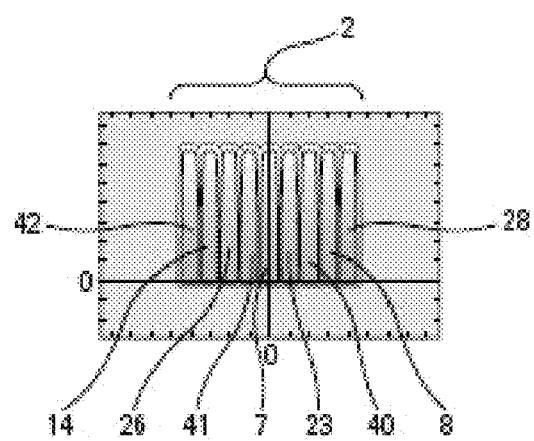
FIG. 5 is a representation of the overall beam of a lighting module according to the invention.

FIG. 5 shows an overall beam 2 originating from a lighting module 1 comprising three distinct lighting devices, each comprising three light emitters secured to one and the same support and spaced from one another. These three lighting devices are arranged, that is to say inclined relative to one another, so that at least one beam emitted by each lighting device fills a zone unlit by one or the other of the lighting devices. In this particular example, each unlit zone has a width equal to twice the width of a light strip.

Thus, this overall beam 2 consists of nine light strips emitted by three lighting devices. The first lighting device 3 generates the first light strip 7, the second light strip 8 and the fourth light strip 14. The second lighting device 4 generates the third light strip 23, the fifth light strip 26 and the sixth light strip 28, the third light strip 23 extending between the first light strip 7 and the second light strip 8 while the fifth light strip 26 extends between the first light strip 7 and the fourth light strip 14. The third lighting device 48 generates a seventh light strip 40, an eighth light strip 41 and a ninth light strip 42, the seventh light strip 40 extending between the third light strip 23 and the second light strip 8 while the eighth light strip 41 extends between the first light strip 7 and the fifth light strip 26. The sixth light strip 28 and the ninth light strip 42 form end strips of the overall beam 2.

It is therefore understood that, according to this exemplary embodiment, the first lighting device 3, the second lighting device 4 and the third lighting device 48 are arranged so that a zone that is unlit by the first lighting device 3 is filled by a beam originating from the second lighting device 4 combined with a beam originating from the third lighting device 48.

According to the variant illustrated in this figure, the light intensity emitted by the light emitters forming the lighting devices is identical for each light emitter.

Figure 6:
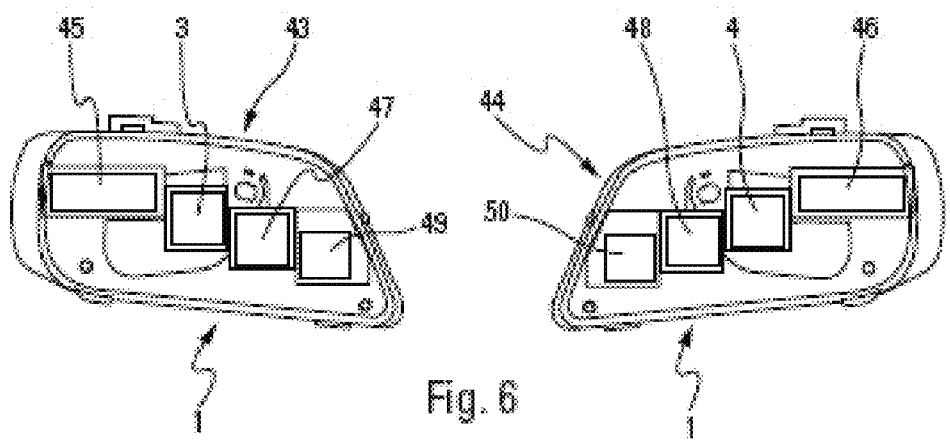
FIG. 6 is a front view of a lighting assembly according to the invention.

FIG. 6 illustrates an installation of the lighting module 1 according to the invention in a lighting assembly capable of being fitted to a motor vehicle, comprising two headlights seen from the front installed one on the front right of the vehicle and the other on the front left of the vehicle.

With respect to the high beam, the lighting module 1 is in this instance split into two portions since the first lighting device 3 is installed in a first headlight 43 while the second lighting device 4 is installed in a second headlight 44, distinct from the first headlight 43. According to this installation example, the lighting module 1 comprises a third lighting device 48, for example conforming to that detailed with respect to FIG. 1 or 5, installed in the second headlight 44.

The first headlight 43 also comprises a first lighting means 45 participating in the production of a low beam, while the second headlight 44 comprises a second lighting means 46 participating in the production of the same low beam.

The first headlight 43 also comprises a long-range lighting device 47 designed to provide a long-distance light beam that is particularly useful for driving on motorways.

The lighting module 1 according to the invention is supplemented by at least one additional lighting means designed to form a side beam adjacent to the overall beam. Such a side beam gives width to the overall beam and thus makes it possible to light up the side of the road traveled by the vehicle.

A first additional lighting means 49 is installed in the first headlight 43 and it is arranged to form a first light beam, for example, in the form of a quarter circle which is positioned beside one of the two end light strips of the overall beam, referenced 14 in FIG. 1 or 42 in FIG. 5. Similarly, the lighting module 1 comprises a second additional lighting means 50 installed in the second headlight 44, the latter being arranged to form a second light beam, for example, in the form of a quarter circle which is positioned beside the other end light strip of the overall beam, the latter being referenced 28 in FIGS. 1 and 5.

In the above description, the emitters employed generate a light beam in the form of a light strip. The invention also covers the use of the light emitter generating a diffuse beam on the path of which a mask is installed comprising a slot which delimits a residual beam in the form of a light strip. In such a case, one slot is provided for each light emitter.

The light strips detailed in the following description are, for example, strips with a clean cut-off. The lighting module 1 according to the invention is arranged so that these light strips are positioned side by side without letting dark strips appear, and optionally without overlap between adjacent light strips.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting module comprising:
at least one first lighting device; and
at least one second lighting device;
said at least one first lighting device comprising a support common to at least one first light emitter generating a first light strip and to at least one second light emitter generating a second light strip, said at least one first light emitter being arranged relative to said at least one second light emitter so as to generate a zone that is unlit by said at least one first lighting device between said first light strip and said second light strip;
wherein said at least one second lighting device generates at least one third light strip which extends in said zone that is unlit, said at least one first lighting device further comprising a single reflector which reflects a first light beam generating said first light strip and a second light beam generating said second light strip.

2. The lighting module according to claim 1, in which said at least one third light strip generated by said at least one second lighting device comprises a width, said first light emitter is spaced from said second light emitter by a distance determined by said width of said third light strip.

3. The lighting module according to claim 2, in which said at least one first lighting device has a first optical axis, said at least one second lighting device has a second optical axis, said first optical axis and said second optical axis crossing or overlapping to form an angle between them, said angle being a non-zero angle.

4. The lighting module according to claim 2, in which at least one second lighting device generates a whole number of light strips, a width of said zone that is unlit being equal to said whole number of light strips generated by said at least one second lighting device, said at least one first light emitter and said at least one second light emitter being spaced by a value corresponding to a multiple or summation of said whole number of light strips generated by said at least one second lighting device.

5. A front headlight for a motor vehicle comprising at least one lighting module according to claim 2.

6. The lighting module according to claim 2, in which said at least one second lighting device comprises a third light emitter and said at least one first lighting device comprises said first light emitter installed between said second light emitter and a fourth light emitter, said first light emitter, said second light emitter and said fourth light emitter being aligned on said support; said at least one second lighting device comprises said third light emitter being installed between a fifth light emitter and a sixth light emitter, said third light emitter, said fifth light emitter and said sixth light emitter being aligned on a frame, a light intensity emitted by both of said first light emitter and by said third light emitter being greater than a light intensity emitted by any one of the other light emitters.

7. The lighting module according to claim 6, in which said at least one second lighting device comprises a single reflector which reflects a light beam emitted by at least one of said third light emitter, said fifth light emitter and said sixth light emitter.

8. The lighting module according to claim 1, in which said at least one first lighting device has a first optical axis, said at least one second lighting device has a second optical axis, said first optical axis and said second optical axis crossing or overlapping to form an angle between them, said angle being a non-zero angle.

9. The lighting module according to claim 8, in which said non-zero angle is between 0.5° and 4°.

10. The lighting module according to claim 9, in which at least one second lighting device generates a whole number of light strips, a width of said zone that is unlit being equal to said whole number of light strips generated by said at least one second lighting device, said at least one first light emitter and said at least one second light emitter being spaced by a value corresponding to a multiple or summation of said whole number of light strips generated by said at least one second lighting device.

11. The lighting module according to claim 9, in which said at least one second lighting device comprises a third light emitter and said at least one first lighting device comprises said first light emitter installed between said second light emitter and a fourth light emitter, said first light emitter, said second light emitter and said fourth light emitter being aligned on said support; said at least one second lighting device comprises said third light emitter being installed between a fifth light emitter and a sixth light emitter, said third light emitter, said fifth light emitter and said sixth light emitter being aligned on a frame, a light intensity emitted by at least one of said first light emitter or by said third light emitter being greater than a light intensity emitted by any one of the other light emitters.

12. The lighting module according to claim 8, in which at least one second lighting device generates a whole number of light strips, a width of said zone that is unlit being equal to said whole number of light strips generated by said at least one second lighting device, said at least one first light emitter and said at least one second light emitter being spaced by a value corresponding to a multiple or summation of said whole number of light strips generated by said at least one second lighting device.

13. The lighting module according to claim 8, in which said at least one second lighting device comprises a third light emitter and said at least one first lighting device comprises said first light emitter installed between said second light emitter and a fourth light emitter, said first light emitter, said second light emitter and said fourth light emitter being aligned on said support; said at least one second lighting device comprises said third light emitter being installed between a fifth light emitter and a sixth light emitter, said third light emitter, said fifth light emitter and said sixth light emitter being aligned on a frame, a light intensity emitted by at least one of said first light emitter or by said third light emitter being greater than a light intensity emitted by any one of the other light emitters.

14. A front headlight for a motor vehicle comprising at least one lighting module according to claim 8.

15. The lighting module according to claim 1, in which said at least one first lighting device comprises a single focusing device which focuses said first light beam and said second light beam.

16. The lighting module according to claim 15, in which said at least one second lighting device comprises a third light emitter and said at least one first lighting device comprises said first light emitter installed between said second light emitter and a fourth light emitter, said first light emitter, said second light emitter and said fourth light emitter being aligned on said support; said at least one second lighting device comprises said third light emitter being installed between a fifth light emitter and a sixth light emitter, said third light emitter, said fifth light emitter and said sixth light emitter being aligned on a frame, a light intensity emitted by at least one of said first light emitter and by said third light emitter being greater than a light intensity emitted by any one of the other light emitters.

17. The lighting module according to claim 1, in which at least one second lighting device generates a whole number of light strips, a width of said zone that is unlit being equal to said whole number of light strips generated by said at least one second lighting device, said at least one first light emitter and said at least one second light emitter being spaced by a value corresponding to a multiple or summation of said whole number of light strips generated by said at least one second lighting device.

18. The lighting module according to claim 17, in which said at least one third light strip generated by said at least one second lighting device comprises a width, said width of said zone is equal to said width of said third light strip.

19. The lighting module according to claim 1, in which said at least one second lighting device comprises a third light emitter and said at least one first lighting device comprises said first light emitter installed between said second light emitter and a fourth light emitter, said first light emitter, said second light emitter and said fourth light emitter being aligned on said support; said at least one second lighting device comprises said third light emitter being installed between a fifth light emitter and a sixth light emitter, said third light emitter, said fifth light emitter and said sixth light emitter being aligned on a frame, a light intensity emitted by at least one of said first light emitter or by said third light emitter being greater than a light intensity emitted by any one of the other light emitters.

20. The lighting module according to claim 19, in which said at least one second lighting device comprises a single reflector which reflects a light beam emitted by at least one of said third light emitter, said fifth light emitter or said sixth light emitter.

21. The lighting module according to claim 19, in which said at least one second lighting device comprises a single focusing device which focuses a light beam emitted by at least one of said third light emitter, said fifth light emitter or said sixth light emitter.

22. A front headlight for a motor vehicle comprising at least one lighting module according to claim 1.

23. A lighting assembly of a motor vehicle comprising two headlights capable of being installed one at the front right of the vehicle and the other at the front left of the vehicle, comprising at least one lighting module according to claim 1, in which said at least one first lighting device is installed in one of the headlights while said at least the second lighting device is installed in the other headlight.

* * * * *